US012694216B1

(12) United States Patent
Mocanu et al.

(10) Patent No.: US 12,694,216 B1
(45) Date of Patent: Jul. 28, 2026

(54) SYSTEMS FOR CONTEXT-AWARE NAMED ENTITY RECOGNITION

(71) Applicant: AMAZON TECHNOLOGIES, INC., Seattle, WA (US)

(72) Inventors: Alexandru Mocanu, Bucharest (RO); Daniel Voinea, Vladiceasca (RO); Silviu Paun, Craiova (RO)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 356 days.

(21) Appl. No.: 18/465,477

(22) Filed: Sep. 12, 2023

(51) Int. Cl.
G06F 16/3331 (2025.01)
G06F 17/16 (2006.01)
G06F 40/295 (2020.01)

(52) U.S. Cl.
CPC .................................. G06F 40/295 (2020.01)

(58) Field of Classification Search
CPC ... G06F 16/3347; G06F 16/3331; G06F 17/16
USPC .............................................................. 704/9
See application file for complete search history.

(56) References Cited

FOREIGN PATENT DOCUMENTS

CA          3217060 A1 * 12/2022    ............... G06N 3/09

OTHER PUBLICATIONS

Zhou et al., Multi-Vector Attention Models for Deep Re-ranking, Microsoft Research, ACL Anthology.org, cited portions of prior art (Year: 2021).*
Xu et al., LayoutLM: Pre-training of Text and Layout for Document Image Understanding, Microsoft Research, ACM Digital Library, KDD '20: The 26th ACM SIGKDD Conference on Knowledge Discovery and Data Mining, Cited portions of prior art (Year: 2020).*
Wu et al., Scalable Zero-shot Entity Linking with Dense Entity Retrieval, Facebook AI Research, ACL Anthology.org, Cited portions of prior art (Year: 2020).*
Brown, et al., "Language Models are Few-Shot Learners", Advances in Neural Information Processing Systems, vol. 33, May 26, 2020, 75 pgs. Retrieved from the Internet: URL: https://arxiv.org/pdf/2005.14165.pdf.

(Continued)

*Primary Examiner* — Hai Phan
*Assistant Examiner* — Ian Scott Mclean
(74) *Attorney, Agent, or Firm* — Lindauer Law, PLLC

(57)                    ABSTRACT

To perform a Named Entity Recognition (NER) operation that accounts for semantic relationships between entity and document text while remaining scalable, entity text and text from portions of documents are encoded separately, in some cases using different encoders such as when the document text also includes layout information. A cross-attention module is then used to determine a weighted embedding for each document embedding, based on the document embedding and each entity embedding. The weighted embeddings include weights indicative of semantic relationships between the document text and the text of each entity. Correspondence between the weighted embeddings and the corresponding document embedding is then used to determine scores representing the probability that an entity is referenced in a portion of a document. Because the weighted embeddings are used, these scores account for semantic relationships between entity and document text.

20 Claims, 4 Drawing Sheets

(56)        References Cited

OTHER PUBLICATIONS

Chen, et al., "LightNER: A Lightweight Tuning Paradigm for Low-resource NER via Pluggable Prompting", Proceedings of the 29th International Conference on Computational Linguistics, Sep. 14, 2022, 14 pgs. Retrieved from the Internet: URL: https://arxiv.org/pdf/2109.00720.pdf.

Clark, et al., "Entity-Centric Coreference Resolution with Model Stacking", Proceedings of the 53rd Annual Meeting of the Association for Computational Linguistics and the 7th International Joint Conference on Natural Language Processing, vol. 1, 2015, 11 pgs. Retrieved from the Internet: URL: https://aclanthology.org/P15-1136.pdf.

Derczynski, et al., "Results of the WNUT2017 Shared Task on Novel and Emerging Entity Recognition", Proceedings of the 3rd Workshop on Noisy User-generated Text, Sep. 7, 2017, 8 pgs. Retrieved from the Internet: URL: https://aclanthology.org/W17-4418.pdf.

Devlin, et al., "BERT: Pre-training of Deep Bidirectional Transformers for Language Understanding", Proceedings of NAACL-HLT 2019, Jun. 2019, 16 pgs. Retrieved from the Internet: URL: https://aclanthology.org/N19-1423.pdf.

Dogan, et al., "NCBI Disease Corpus: A Resource for Disease Name Recognition and Concept Normalization", National Institutes of Health, J Biomed Inform., Feb. 2014, 28 pgs. Retrieved from the Internet: URL: https://www.ncbi.nlm.nih.gov/pmc/articles/PMC3951655/pdf/nihms557856.pdf.

Fritzler, et al., "Few-shot classification in Named Entity Recognition Task", Proceedings of the 34th ACM/SIGAPP Symposium on Applied Computing, Dec. 14, 2018, 8 pgs. Retrieved from the Internet: URL: https://arxiv.org/pdf/1812.06158.pdf.

Gururangan, et al., "Don't Stop Pretraining: Adapt Language Models to Domains and Tasks", Proceedings of the 58th Annual Meeting of the Association for Computational Linguistics, Jul. 2020, 19 pgs. Retrieved from the Internet: URL: https://aclanthology.org/2020.acl-main.740.pdf.

Hou, et al., "Few-shot Slot Tagging with Collapsed Dependency Transfer and Label-enhanced Task-adaptive Projection Network", Jun. 10, 2020, 13 pgs. Retrieved from the Internet: URL: https://arxiv.org/pdf/2006.05702.pdf.

Humeau, et al., "Poly-encoders: Architectures and Pre-training Strategies for Fast and Accurate Multi-sentence Scoring", ICLR 2020, Dec. 19, 2019 13 pgs. Retrieved from the Internet: URL: https://openreview.net/attachment?id=SkxgnnNFvH&name=original_pdf.

Jia, et al., "Question Answering infused Pre-training of General-Purpose Contextualized Representations", Findings of the Association for Computational Linguistics: ACL 2022, May 2022, 18 pgs. Retrieved from the Internet: URL: https://aclanthology.org/2022.findings-acl.59.pdf.

Karpukhin, et al., "Dense Passage Retrieval for Open-Domain Question Answering", Proceedings of the 2020 Conference on Empirical Methods in Natural Language Processing, Nov. 2020, 13 pgs. Retrieved from the Internet: URL: https://aclanthology.org/2020.emnlp-main.550.pdf.

Kim, et al., "Introduction to the Bio-Entity Recognition Task at JNLPBA", Proceedings of the International Joint Workshop on Natural Language Processing in Biomedicine and its Applications, Aug. 2004, 6 pgs. Retrieved from the Internet: URL: https://aclanthology.org/W04-1213.pdf.

Kingma, et al., "ADAM: a Method for Stochastic Optimization", ICLR 2015 Conference Paper, Dec. 22, 2014, 13 pgs. Retrieved from the Internet: URL: https://arxiv.org/pdf/1412.6980.pdf.

Kojima, et al., "Large Language Models are Zero-Shot Reasoners", Advances in Neural Information Processing Systems, vol. 35, 2022, 15 pgs. Retrieved from the Internet: URL: https://proceedings.neurips.cc/paper_files/paper/2022/file/8bb0d291acd4acf06ef112099c16f326-Paper-Conference.pdf.

Li, et al., "A Unified MRC Framework for Named Entity Recognition", Proceedings of the 58th Annual Meeting of the Association for Computational Linguistics, Jul. 2020, 11 pgs. Retrieved from the Internet: URL: https://aclanthology.org/2020.acl-main.519.pdf.

Liu, et al., "Generated Knowledge Prompting for Commonsense Reasoning", Proceedings of the 60th Annual Meeting of the Association for Computational Linguistics, vol. 1, May 2022, 16 pgs. Retrieved from the Internet: URL: https://aclanthology.org/2022.acl-long.225.pdf.

Liu, et al., "RoBERTa: A Robustly Optimized BERT Pretraining Approach", arXiv, Computer Science - Computation and Language, Jul. 26, 2019, 13 pgs. Retrieved from the Internet: URL: https://arxiv.org/pdf/1907.11692.pdf.

Ma, et al., "Label Semantics for Few Shot Named Entity Recognition", Findings of the Association for Computational Linguistics: ACL 2022, May 2022, 16 pgs. Retrieved from the Internet: URL: https://aclanthology.org/2022.findings-acl.155.pdf.

McCann, et al., "The Natural Language Decathlon: Multitask Learning as Question Answering", Jun. 20, 2018, 23 pgs. Retrieved from the Internet: URL: https://arxiv.org/pdf/1806.08730.pdf.

Min, et al., "Rethinking the Role of Demonstrations: What Makes In-Context Learning Work?", Proceedings of the 2022 Conference on Empirical Methods in Natural Language Processing, Dec. 2022, 17 pgs. Retrieved from the Internet: URL: https://aclanthology.org/2022.emnlp-main.759.pdf.

Molla, et al., "Named Entity Recognition for Question Answering", Proceedings of the 2006 Australasian Language Technology Workshop, 2006, 8 pgs. Retrieved from the Internet: URL: https://aclanthology.org/U06-1009.pdf.

Paolini, et al., "Structured Prediction as Translation Between Augmented Natural Languages", Published as a conference paper at ICRL 2021, 2021, 26 pgs. Retrieved from the Internet: URL: https://assets.amazon.science/bd/ee/7f99a707464aa1f0d41fd3a5f92c/structured-prediction-as-translation-between-augmented-natural-languages.pdf.

Pradhan, et al., "CoNLL-2012 Shared Task: Modeling Multilingual Unrestricted Coreference in OntoNotes", Proceedings of the Joint Conference on EMNLP and CoNLL: Shared Task, Jul. 13, 2012, 40 pgs. Retrieved from the Internet: URL: https://aclanthology.org/W12-4501.pdf.

Raffel, et al., "Exploring the Limits of Transfer Learning with a Unified Text-to-Text Transformer", Journal of Machine Learning Research 21, 2020, 67 pgs. Retrieved from the Internet: URL: https://arxiv.org/pdf/1910.10683.pdf.

Reimers, et al., "Sentence-BERT: Sentence Embeddings using Siamese BERT-Networks", Proceedings of the 2019 Conference on Empirical Methods in Natural Language Processing and the 9th International Joint Conference on Natural Language Processing, Nov. 2019, 11 pgs. Retrieved from the Internet: URL: https://aclanthology.org/D19-1410.pdf.

Sang, et al., "Introduction to the CoNILL-2003 Shared Task: Language-Independent Named Entity Recognition", Jun. 12, 2003, 6 pgs. Retrieved from the Internet: URL: https://arxiv.org/pdf/cs/0306050.pdf.

Schick, et al., "It's Not Just Size That Matters: Small Language Models Are Also Few-Shot Learners", Proceedings of the 2021 Conference of the North American Chapter of the Association for Computational Linguistics: Human Language Technologies, Jun. 2021, 14 pgs. Retrieved from the Internet: URL: https://aclanthology.org/2021.naacl-main.185.pdf.

Segal, et al., "A Simple and Effective Model for Answering Multi-span Questions", Proceedings of the 2020 Conference on Empirical Methods in Natural Language Processing, Nov. 2020, 7 pgs. Retrieved from the Internet: URL: https://aclanthology.org/2020.emnlp-main.248.pdf.

Shinzato, et al., "Simple and Effective Knowledge-Driven Query Expansion for QA-Based Product Attribute Extraction", Proceedings of the 60th Annual Meeting of the Association for Computational Linguistics, May 2022, 8 pgs. Retrieved from the Internet: URL: https://aclanthology.org/2022.acl-short.25.pdf.

(56)                References Cited

OTHER PUBLICATIONS

Shrimal, et al., "NER-MQMRC: Formulating Named Entity Recognition as Multi Question Machine Reading Comprehension", Proceedings of the 2022 Conference of the North American Chapter of the Association for Computational Linguistics: Human Language Technologies, Industry Track, Jul. 2022, 8 pgs. Retrieved from the Internet: URL: https://aclanthology.org/2022.acl-short.25.pdf.

Stubbs, et al., "Annotating longitudinal clinical narratives for de-identification: the 2014 i2b2/UTHealth Corpus", Journal of biomedical informatics, 2015, 31 pgs. Retrieved from the Internet: URL: https://www.ncbi.nlm.nih.gov/pmc/articles/PMC4978170/pdf/nihms806528.pdf.

Vaswani, et al., "Attention Is All You Need", 31st Conference on Neural Information Processing Systems, vol. 30, 2017, 11 pgs. Retrieved from the Internet: URL: https://proceedings.neurips.cc/paper_files/paper/2017/file/3f5ee243547dee91fbd053c1c4a845aa-Paper.pdf.

Wei, et al., "Chain-of-Thought Prompting Elicits Reasoning in Large Language Models", 36th Conference on Neural Information Processing Systems, 2022, 14 pgs. Retrieved from the Internet: URL: https://proceedings.neurips.cc/paper_files/paper/2022/file/9d5609613524ecf4f15af0f7b31abca4-Paper-Conference.pdf.

Weischedel, et al., "OntoNotes Release 5.0", Linguistic Data Consortium, 2013, 53 pgs. Retrieved from the Internet: URL: https://catalog.ldc.upenn.edu/docs/LDC2013T19/OntoNotes-Release-5.0.pdf.

Xu, et al., "LayoutLM: Pre-training of Text and Layout for Document Image Understanding", Proceedings of the 26th ACM SIGKDD International Conference on KNowledge Discovery and Data Mining, Jun. 16, 2020, 9 pgs. Retrieved from the Internet: URL: https://arxiv.org/pdf/1912.13318.pdf.

Yang, et al., "Simple and Effective Few-Shot Named Entity Recognition with Structured Nearest Neighbor Learning", Proceedings of the 2020 Conference on Empirical Methods in Natural Language Processing, Nov. 2020, 11 pgs. Retrieved from the Internet: URL: https://aclanthology.org/2020.emnlp-main.516.pdf.

* cited by examiner

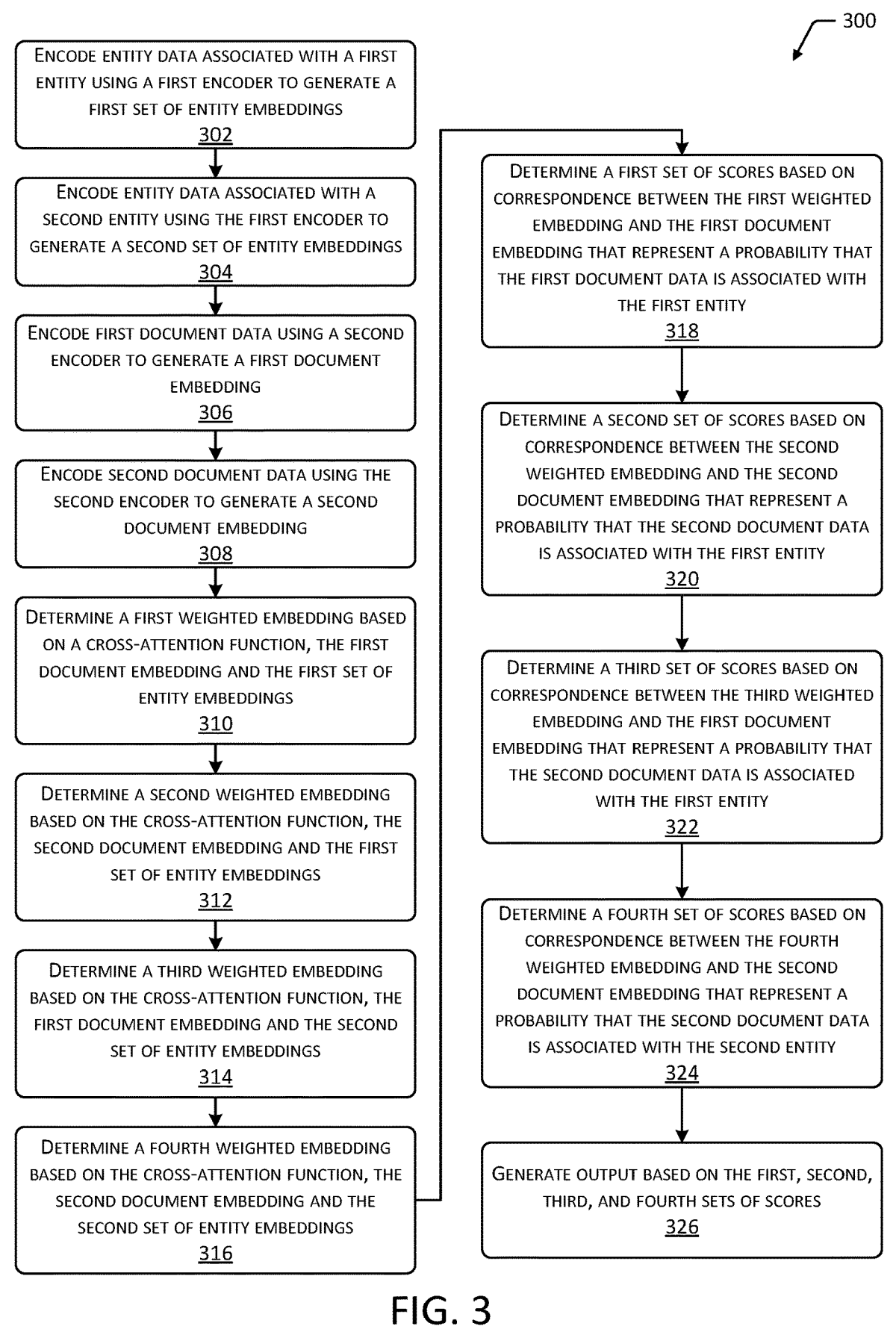

300

ENCODE ENTITY DATA ASSOCIATED WITH A FIRST ENTITY USING A FIRST ENCODER TO GENERATE A FIRST SET OF ENTITY EMBEDDINGS
302

ENCODE ENTITY DATA ASSOCIATED WITH A SECOND ENTITY USING THE FIRST ENCODER TO GENERATE A SECOND SET OF ENTITY EMBEDDINGS
304

ENCODE FIRST DOCUMENT DATA USING A SECOND ENCODER TO GENERATE A FIRST DOCUMENT EMBEDDING
306

ENCODE SECOND DOCUMENT DATA USING THE SECOND ENCODER TO GENERATE A SECOND DOCUMENT EMBEDDING
308

DETERMINE A FIRST WEIGHTED EMBEDDING BASED ON A CROSS-ATTENTION FUNCTION, THE FIRST DOCUMENT EMBEDDING AND THE FIRST SET OF ENTITY EMBEDDINGS
310

DETERMINE A SECOND WEIGHTED EMBEDDING BASED ON THE CROSS-ATTENTION FUNCTION, THE SECOND DOCUMENT EMBEDDING AND THE FIRST SET OF ENTITY EMBEDDINGS
312

DETERMINE A THIRD WEIGHTED EMBEDDING BASED ON THE CROSS-ATTENTION FUNCTION, THE FIRST DOCUMENT EMBEDDING AND THE SECOND SET OF ENTITY EMBEDDINGS
314

DETERMINE A FOURTH WEIGHTED EMBEDDING BASED ON THE CROSS-ATTENTION FUNCTION, THE SECOND DOCUMENT EMBEDDING AND THE SECOND SET OF ENTITY EMBEDDINGS
316

DETERMINE A FIRST SET OF SCORES BASED ON CORRESPONDENCE BETWEEN THE FIRST WEIGHTED EMBEDDING AND THE FIRST DOCUMENT EMBEDDING THAT REPRESENT A PROBABILITY THAT THE FIRST DOCUMENT DATA IS ASSOCIATED WITH THE FIRST ENTITY
318

DETERMINE A SECOND SET OF SCORES BASED ON CORRESPONDENCE BETWEEN THE SECOND WEIGHTED EMBEDDING AND THE SECOND DOCUMENT EMBEDDING THAT REPRESENT A PROBABILITY THAT THE SECOND DOCUMENT DATA IS ASSOCIATED WITH THE FIRST ENTITY
320

DETERMINE A THIRD SET OF SCORES BASED ON CORRESPONDENCE BETWEEN THE THIRD WEIGHTED EMBEDDING AND THE FIRST DOCUMENT EMBEDDING THAT REPRESENT A PROBABILITY THAT THE SECOND DOCUMENT DATA IS ASSOCIATED WITH THE FIRST ENTITY
322

DETERMINE A FOURTH SET OF SCORES BASED ON CORRESPONDENCE BETWEEN THE FOURTH WEIGHTED EMBEDDING AND THE SECOND DOCUMENT EMBEDDING THAT REPRESENT A PROBABILITY THAT THE SECOND DOCUMENT DATA IS ASSOCIATED WITH THE SECOND ENTITY
324

GENERATE OUTPUT BASED ON THE FIRST, SECOND, THIRD, AND FOURTH SETS OF SCORES
326

FIG. 3

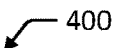
400

COMPUTING DEVICE(S) 402

POWER SUPPLY
404

COMMUNICATION
INTERFACE(S) 410

I/O INTERFACE(S)
412

PROCESSOR(S)
406

NETWORK
INTERFACE(S) 414

CLOCK(S)
408

I/O DEVICE(S) 416

MEMORY 418

OPERATING SYSTEM MODULE
420

COMMUNICATION MODULE
424

ENTITY ENCODER
104

DOCUMENT ENCODER
110

CROSS-ATTENTION MODULE
114

SCORING MODULE
118

OUTPUT MODULE
122

OTHER MODULES
426

DATA STORE 422

ENTITY DATA 102

ENTITY EMBEDDINGS 106

DOCUMENT DATA 108

DOCUMENT EMBEDDINGS 112

WEIGHTED EMBEDDINGS 116

CORRESPONDENCE SCORES 120

OUTPUT DATA 124

OTHER DATA 428

FIG. 4

SYSTEMS FOR CONTEXT-AWARE NAMED ENTITY RECOGNITION

BACKGROUND

Named Entity Recognition (NER) processes are used to analyze documents or other bodies of text to determine portions of the text that reference or are related to selected text ("entities"). These processes are typically performed using sequence labeling operations or machine learning models. The manner in which the text associated with documents and entities is encoded and processed may affect the computational cost, required training of machine learning models, scalability, and the ability of a system to account for relationships between different text.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 is a flow diagram depicting an implementation of a method for determining whether text included in documents references text associated with one or more entities.

FIG. 4 is a block diagram depicting an implementation of a computing device within the present disclosure.

Figure 1:
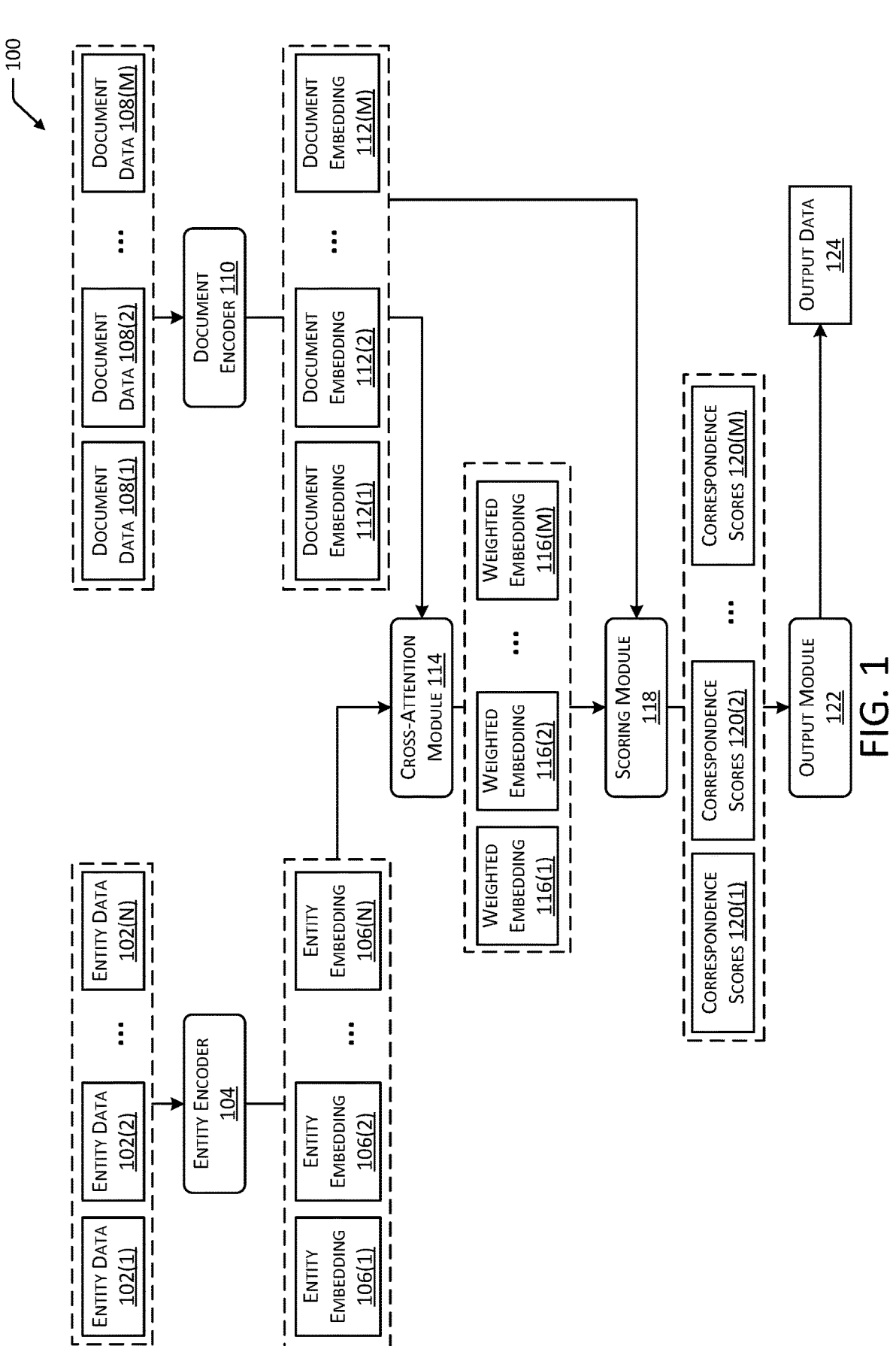
FIG. 1 is a diagram depicting an implementation of a machine-learning system for determining whether text included in documents references text associated with one or more entities.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Sequence labeling processes, machine learning algorithms, or other techniques may be used to analyze bodies of text, such as documents, to determine whether the text includes selected terms or other characteristics, and in some cases extract information from the text. This process is sometimes referred to as Named Entity Recognition (NER), in which the terms or characteristics are referred to as "entities". For example, unstructured text may describe an item available for purchase using an online store, and certain portions of the text may indicate various characteristics of the item, such as dimensions, materials, a type or category of the item, and so forth. In cases where an online store offers a large number of items for purchase, lease, subscription, and so forth, it may be desirable to use computing devices to process the text associated with the items to determine whether selected information, such as information associated with legal or regulatory compliance, or other characteristics, is present. In some cases, an NER process may be performed as a sequence labeling task, which may determine portions of the text that are associated with various characteristics. In other cases, an NER process may be performed using one or more machine learning models to determine a portion of the text that is likely to be associated with a selected characteristic.

One example type of machine-learning system used to perform NER operations is a cross-encoder. When using a cross-encoder, text representing entities may be divided into tokens ("entity tokens"), each token typically representing a portion of the text representing the entity, such as a word sub-unit (e.g., a group of characters). Text within a document may similarly be divided into tokens ("document tokens"), each token representing a portion of the text of the document. For example, a token may include a small unit of text, such as a sub-word or group of characters, used by a language model to analyze or predict text through a series of mathematical operations applied on a token or sequence of tokens. Both the entity tokens and document tokens are encoded, using a single encoder, to generate document-entity embeddings that represent the contents of the entity text and document text. A machine learning system is trained to analyze the document-entity embeddings and generate scores or another type of output for each document-token embedding, the score representing a probability that the document token that was encoded together with an entity token to form a particular embedding contains the text represented by the entity token. Because the cross-encoder uses embeddings that are created by encoding document tokens and entity tokens together, the scores determined using a cross-encoder account for semantic relationships between the text of a document and the text of an entity. However, use of cross-encoders is impractical for large numbers of entities, because generation of a set of document-entity embeddings for each entity, and analysis of each resulting set of document-entity embeddings, requires significant computational resources.

Another type of machine-learning system used to perform NER operations is a bi-encoder. When using a bi-encoder, text representing entities may be divided into tokens, each token typically representing a portion of the text associated with the entity, and text within a document may be divided into tokens, each token representing a portion of the text of the document. Each entity token is encoded to generate a respective entity embedding. Each document token is encoded separately from the entity tokens to generate a respective document embedding. The entity embeddings are then pooled to generate a single representation of the entities. A machine learning system is trained to determine correspondence between this pooled representation of the entity embeddings and each document embedding, such as by determining a dot product of the entity representation and the document embedding, and generate scores or another type of output for each of these comparisons, the score representing a probability that the document token contains the text represented by the entity tokens. Typically, a bi-encoder is trained to account for semantic relationships between tokens as part of the training process, rather than encoding document and entity tokens together as with a cross-encoder, and therefore does not account for the same relationships that may be determined using a cross-encoder. However, a bi-encoder may be more readily scalable in cases where an NER operation includes a large number of entities.

Described in this disclosure are techniques for processing text to determine the presence of selected text, such as an NER operation, that are scalable, but also account for the semantic relationships between the input text. A set of entity descriptors or other text are divided into entity tokens that are each encoded, using a first encoder, to generate a respective entity embedding for each entity token. Portions of document text (e.g., document tokens) are also each encoded, using a second encoder, to generate a respective document embedding for each document token. The second encoder and first encoder may include different types of encoders. For example, data representing the entity descriptors and data representing the document may include different types of data. Continuing the example, a document may include both text data and layout data, and the second encoder used to generate the document embeddings may be configured to determine the embeddings based in part on the layout data, while the first encoder used to generate the entity embeddings may be focused on processing text data. Example encoders may include language models, such as a Bidirectional Encoder Representation from Transformers (BERT) model, other types of transformer-based language models such as a Robustly Optimized BERT Pre-training Approach (RoBERTA), or other language models.

Semantic relationships between the text represented by a document embedding and the text represented by each entity embedding may be determined using a cross-attention function. For example, based on the cross-attention function, a particular document embedding, and each entity embedding, a weighted embedding may be determined for each document embedding. The weighted embedding that corresponds to the text of the document token represents an embedding of the semantically relevant entity tokens for the respective document token. For example, the weighted embedding may include a weighted average of the entity embeddings that are weighted based on the semantic relationship of each embedding with the respective document embedding. Continuing the example, the values of a weighted embedding may deprioritize entity text that is not semantically related to the document text.

In some implementations, weighted embeddings may be determined by generating a first matrix (T) based on the document embeddings, a second matrix (L) based on the entity embeddings, and performing the cross-attention function based on Equation 1 below, in which a third matrix (U) that includes the weighted embeddings is determined.

$$U = \text{softmax} \left( TL^T \right) L \qquad \text{(EQUATION 1)}$$

A respective score may be determined based on correspondence between a weighted embedding and the corresponding document embedding that was used to determine the weighted embedding, the score representing a probability that the document text represented by the document embedding references the entity text represented by the weighted embedding. In some implementations, a score for a weighted embedding and a document embedding may be determined based on a dot product of the embeddings. A dot product (sometimes referred to as a scalar product) is an algebraic operation that determines a numeric value based on two equal-length sequences of numbers, such as coordinate vectors, which may include embeddings. For example, the dot product is the sum of the products of the corresponding entries of the two sequences of numbers, and may geometrically represent the Euclidean magnitudes of the two vectors and the cosine of the angle between them. As such, a dot product for two vectors: $a=[a_1, a_2, \ldots, a_n]$ and $b=[b_1, b_2, \ldots, b_n]$ may be determined as the product of the two coordinate vectors, as indicated in Equation 2 below, or geometrically based on the length of the vectors and the cosine of the angle ($\theta$) between them, as indicated in Equation 3 below.

$$\sum_{i=1}^{n} a_i b_i = a_1 b_1 + a_2 b_2 + \ldots + a_n b_n \qquad \text{(EQUATION 2)}$$

$$a \circ b = \|a\|\|b\| \cos \theta \qquad \text{(EQUATION 3)}$$

Because the techniques described herein use a cross-attention function to determine a weighted embedding based on a document embedding and each entity embedding, the determined scores are affected by the semantic relationships between entity text and document text, improving the accuracy of the results. Additionally, because the techniques described herein separately encode the entity text and document text to determine respective sets of embeddings, the techniques are scalable and do not require joint encodings for each entity that is used. Further, use of separate encoders for entity text and document text may enable use of different types of encoders to accommodate different types of data, such as a separate encoder for document text that generates embeddings based on both text data and layout data.

FIG. 1 is a diagram 100 depicting an implementation of a machine-learning system for determining whether text included in documents references text associated with one or more entities. For example, the system of FIG. 1 may be used to perform an NER operation to determine whether one or more named entities are referenced in a particular document or set of documents. Entity data 102 that includes text descriptions, names, or terms associated with various entities may be divided into tokens. For example, FIG. 1 depicts first entity data 102(1) that may include a first portion of text associated with an entity, such as a first token, second entity data 102(2) that may include a second portion of text associated with the entity, such as a second token, and any number of additional entity data 102(N) that may each include respective tokens or other portions of the text associated with the entity. In some cases, the entity data 102 may correspond to a single named entity, however in other implementations, entity data 102 for multiple entities may be processed. In some implementations, the entity data 102 may include one or more other types of data, such as layout data, image data, and so forth.

An entity encoder 104 may encode each entity data 102 to determine a respective entity embedding 106. An entity embedding 106 may include a contextualized representation of the word(s) or other text included in entity data 102. For example, entity data 102 may include text associated with the entity. Such text may include a group of characters, such as a token. In other cases, entity data 102 may include a word or a group of words. An entity embedding 106 for particular entity data 102 may include a vector or other valued representation of the text associated with the entity data 102, the vector encoding the meaning of the text in such a way that text that is close together in vector space is expected to be similar in meaning. In some implementations, the entity encoder 104 may include one or more language models, such as a transformer-based language model (e.g., BERT or RoBERTA), or other types of language models. In cases where the entity data 102 includes types of data other than text data, the entity encoder 104 may include one or more models that are configured to determine embeddings based on layout data, image data, or other types of data. The entity encoder 104 may determine a respective entity embedding 106 for each entity data 102. For example, a first entity embedding 106(1) may be determined based on the first entity data 102(1), a second entity embedding 106(2) may be determined based on the second entity data 102(2), and any number of respective additional entity embeddings 106(N) may each be determined based on additional entity data 102(N).

Document data 108 may include text within a document or set of documents. For example, each document data 108 may represent a portion of the text within a document. For example, document data 108 may include a group of characters, such as a token. In other cases, document data 108 may include a word or group of words. For example, FIG. 1 depicts first document data 108(1) that may include a first token, second document data 108(2) that may include a second token, and any number of additional document data 108(M) that may each include a respective token. In some implementations, in addition to text data, the document data 108 may include layout data, or one or more other types of data, such as image data.

A document encoder 110 may encode each document data 108 to determine a respective document embedding 112. A document embedding 112 may include a contextualized representation of text included in respective document data 108. For example, a document embedding 112 may include a vector or other valued representation. In some implementations, the document encoder 110 may include one or more transformer-based language models, or other types of language models. In cases where the document data 108 includes one or more types of data other than text data, the document encoder 110 may include one or more models configured to determine embeddings based on the other types of data. In some cases, the document encoder 110 may include a different type of encoder than the entity encoder 104. For example, if the entity data 102 includes text data and the document data 108 includes text data and layout data, the entity encoder 104 may include a transformer-based language model, while the document encoder 110 may include one or more models configured to determine embeddings based on layout data and text data. FIG. 1 depicts a first document embedding 112(1) that may be determined based on the first document data 108(1), a second document embedding 112(2) that may be determined based on the second document data 108(2), and any number of respective additional document embeddings 112(M) that may each be determined based on additional document data 108(M). The number of entity embeddings 106 that are determined may differ from the number of document embeddings 112 that are determined. For example, a document that includes a large amount of text may be divided into a larger number of tokens than the text associated with an entity, resulting in a large number of embeddings associated with the document when each token is encoded.

A cross-attention module 114 may determine weighted embeddings 116 based on the entity embeddings 106 and the document embeddings 112. Specifically, a cross-attention module 114 may determine a respective weighted embedding 116 for each individual document embedding 112 based on the individual document embedding 112 and the set of entity embeddings 106 associated with the entity. As such, the cross-attention module 114 may receive a particular document embedding 112 and each of the entity embeddings 106 as inputs and may output a respective weighted embedding 116 that corresponds to the particular document embedding. For example, FIG. 1 depicts a first weighted embedding 116(1) associated with the first document embedding 112(1), a second weighted embedding 116(2) associated with the second document embedding 112(2), and any number of respective additional weighted embeddings 116 (M) based on additional document embeddings 112(M). The cross-attention module 114 may facilitate alignment between the entity embeddings 106 and relevant portions of a document embedding 112, such as portions of the document embedding 112 representing text that is semantically related to text represented by an entity embedding 106. As described previously, in some implementations, the cross-attention module 114 may determine a first matrix based on the entity embeddings 106 and a second matrix based on the document embeddings 112, and may determine a third matrix that includes the weighted embeddings 116 based on the first matrix and second matrix. In some implementations, the attention mechanism of the transformer architecture of the cross-attention module 114 may use the document embeddings 112 as queries while the entity embeddings 106 act as keys and values. For example, Equation 1, described above, presents one possible relationship between the third matrix and the first and second matrices. The weighted embeddings 116 may store values for a represented document embedding 112 that indicate alignment with the entity embeddings 106. For example, the weighted embeddings 116 may include one or more weights based on the semantic relationships between entity embeddings 106 and represented document embedding 112 for which the weighted embedding 116 was determined. In some implementations, the weights may include normalized dot products between the document embedding 112 and the entity embeddings 106. Larger weights may be associated with entity embeddings 106 having a stronger semantic relationship to the document embedding 112, which may cause portions of the document embedding 112 having a strong semantic relationship with the entity embeddings 106 to have a greater effect on one or more scores.

A scoring module 118 may determine correspondence scores 120 based on correspondence between each weighted embedding 116 and the corresponding document embedding 112 from which the weighted embedding 116 was determined. A correspondence score 120 may indicate a probability that the text represented by a particular document embedding 112 references or may be classified as a particular entity. In some implementations, the correspondence scores 120 may be determined based on dot product operations between the weighted embeddings 116 and the document embeddings 112. For example, FIG. 1 depicts a first correspondence score or set of correspondence scores 120(1) associated with the first document embedding 112(1), a second first correspondence score or set of correspondence scores 120(2) associated with the second document embedding 112(2), and any number of respective additional individual first correspondence scores or sets of correspondence scores 120(M) associated with additional document embeddings 112. A correspondence score 120 associated with a particular document embedding 112 may indicate a probability that the document data 108 represented by the document embedding 112 corresponds to a particular entity.

Use of the cross-attention module 114 to determine weighted embeddings 116 may enable the correspondence scores 120 to account for semantic relationships between the text represented by the entity embeddings 106 and the text represented by the document embeddings 112, without requiring the entity tokens and document tokens to be encoded together. Use of separate encoders for the entity data 102 and document data 108 may facilitate scalability, enabling large numbers of entities to be analyzed, and may enable processing of entity data 102 and document data 108 that include different types of data, by using different encoders that are suitable for processing the respective types of data included in the entity data 102 and document data 108.

For example, one or more document tokens may include the name of a city, while a set of entity tokens for the entity "location" may include the descriptors "country, city, mountain range, body of water". Based on a strong semantic alignment between the name of the city and the descriptor "city", the cross-attention module 114 may determine a weighted embedding 116 that prioritizes portions of a document embedding 112 that represent text that is semantically related to the descriptor "city", resulting in a correspondence score 120 indicating a stronger relationship between the document data 108 that includes the name of the city and the entity data 102 for the entity "location".

An output module 122 may generate output data 124 based on one or more of the correspondence scores 120. For example, the output data 124 may include one or more correspondence scores 120, or one or more qualitative or quantitative indications of relationships between document data 108 and respective entity data 102, such as particular portions of documents that reference particular entities.

Figure 2:
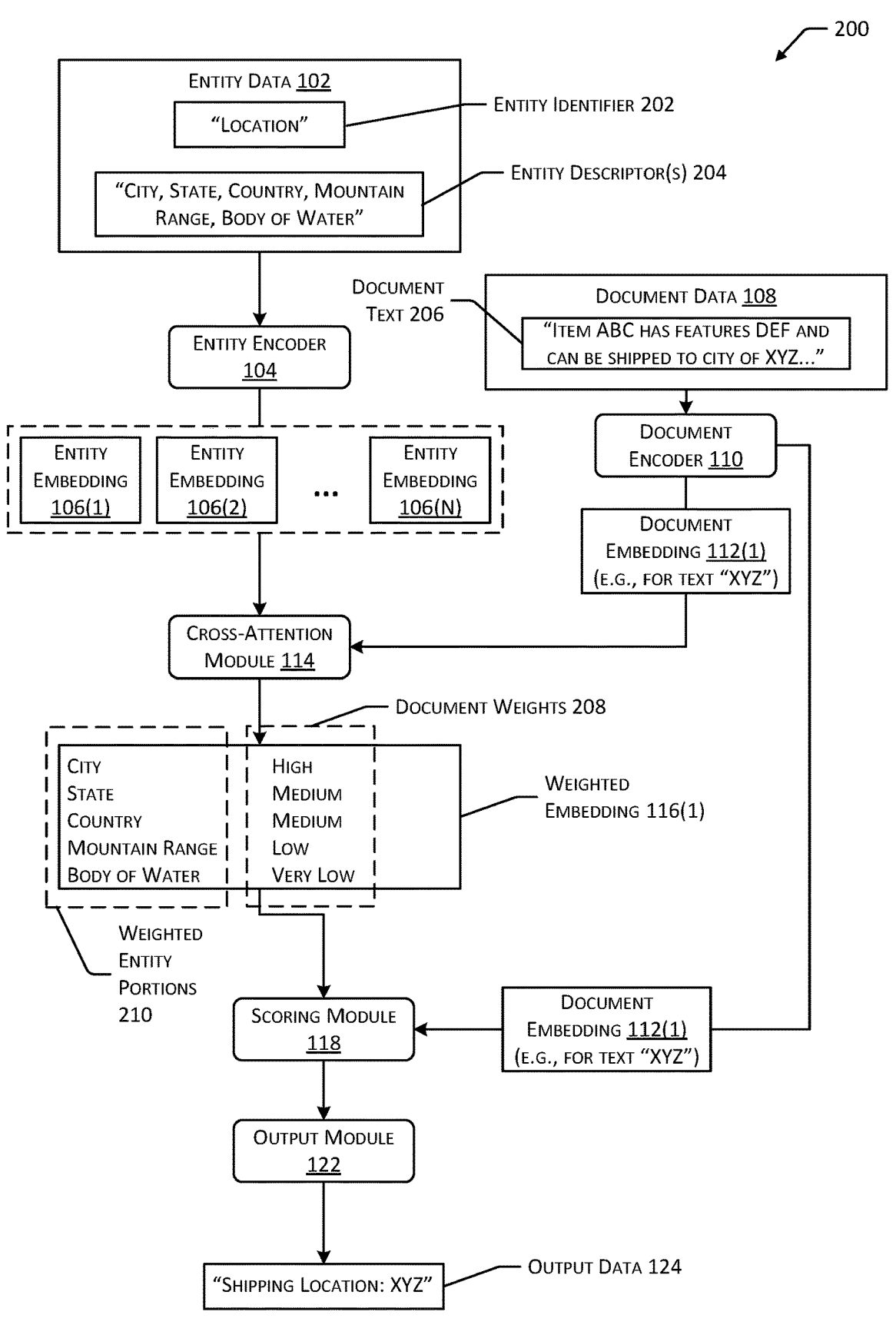
FIG. 2 is a diagram depicting example implementations of entity data, document data, and a weighted embedding that are used to determine output data indicative of correspondence between the text of the entity data and the text of the document data.

FIG. 2 is a diagram 200 depicting example implementations of entity data 102, document data 108, and a weighted embedding 116 that are used to determine output data 124 indicative of correspondence between the text of the entity data 102 and the text of the document data 108. As described with regard to FIG. 1, entity data 102 may include text associated with a named entity, such as one or more tokens, words, groups of words, or types or categories of words, used to perform an NER operation to determine the likelihood that a document references the named entity. For example, the entity data 102 may include an entity identifier 202, such as a name, category, or other type of data that may be descriptive of the named entity or otherwise used to differentiate the named entity from other entities. The entity data 102 may also include one or more entity descriptors 204, which may include other text associated with or descriptive of the named entity. For example, FIG. 2 depicts entity data 102 associated with the entity "location", which is associated with entity descriptors 204 such as "city, state, country, mountain range, body of water". Continuing the example, a document that includes text that is semantically related to one or more of the entity descriptors 204, such as the text "city of XYZ" may be determined to have a high probability of referencing the "location" entity, with the text "XYZ" indicating a particular location. As shown in FIG. 2, the document data 108 may include document text 206 that may reference various named entities, as well as text that does not reference a named entity. For example, FIG. 2 depicts the document text 206 "Item ABC has features DEF and can be shipped to city of XYZ."

As described with regard to FIG. 1, an entity encoder 104 may determine one or more entity embeddings 106 based on the entity data 102, and a document encoder 110 may determine one or more document embeddings 112 based on the document data 108. The cross-attention module 114 may then determine a weighted embedding 116, for each individual document embedding 112, based on the entity embeddings 106 and the individual document embedding 112. For example, FIG. 2 depicts inputs to the cross-attention module 114 that include an example document embedding 112(1) determined based on the document text "XYZ", and each entity embedding 106 determined based on the entity descriptors 204. The weighted embedding 116(1) for the document embedding 112(1) may associate the weighted entity portions 210 with corresponding document weights 208. In the example weighted embeddings 116(1) shown in FIG. 2, the weighted entity portion 210 associated with the text "City" is associated with a "High" document weight 208. For example, because the document text 206 includes the text "city of XYZ" and the entity descriptors 204 include the text "city", a weighted embedding 116(1) that associates the corresponding weighted entity portion 210 with a high document weight 208 may cause one or more correspondence scores 120 to be more heavily affected by text that is semantically related to the entity descriptor 204 "city". The weighted embeddings 116 may also associate one or more other weighted entity portions 210 with corresponding document weights 208.

As described with regard to FIG. 1, a scoring module 118 may determine a correspondence score 120 based on correspondence between a weighted embedding 116 and the corresponding document embedding 112 used to determine the weighted embedding 116. An output module 122 may generate output data 124 based on the correspondence score 120. For example, output data 124 may indicate whether a particular document references a particular named entity, and in some cases, the text of the document that references an entity may be included in the output data 124. Continuing the example, the output data 124 may indicate that the text "XYZ" from the document text 206 is associated with the entity "location" due to the correspondence score 120 being heavily influenced by the document weight 208 for the text "city". Because the document text 206 "XYZ" has a strong semantic relationship with the weighted document portion 210 "city", the output data 124 may indicate that the text "XYZ" is a reference to the "location" entity.

FIG. 3 is a flow diagram 300 depicting an implementation of a method for determining whether text included in documents references text associated with one or more entities. At 302, entity data 102 associated with a first entity may be encoded using a first encoder to generate a first set of entity embeddings 106. As described with regard to FIG. 1, the entity data 102 may include text that identifies or is descriptive of an entity. The entity data 102 may be particular text or a type or category of text that is selected for analysis of one or more documents, such as to determine whether documents reference an entity, the particular text within a document that references the entity, and so forth. For example, a machine learning system may be trained using text data that includes a strong semantic relationship between the name of a particular city and the text "city", while a selected entity may include the term "location" and descriptive text such as "city, state, country". As such, the machine learning system may be trained to determine portions of a document that include the names of cities, states, or countries as "locations" based on the semantic proximity of these names to the descriptor of the "location" entity. The first encoder may include one or more language models configured to generate vector embeddings or other representations of text based on the characteristics of the text. In cases where the entity data 102 includes other types of data, such as layout data, the first encoder may include models configured to determine the first set of entity embeddings

106 based in part on the layout data. The determined first set of entity embeddings 106 may therefore include vector or other valued representation of respective tokens, words, or groups of words, in which the embedding represents the associated text in such a way that different text that is closer together in vector space is expected to be semantically similar.

At 304, entity data 102 associated with a second entity may be encoded using the first encoder to generate a second set of entity embeddings 106. While FIG. 2 describes an implementation in which entity data 102 representing two entities is encoded to generate sets of entity embeddings 106, any number of entities represented by entity data 102 may be encoded in the manner described herein. The entity data 102 used to generate the second set of entity embeddings 106 may include the same type(s) of data as the entity data 102 used to generate the first set of entity embeddings 106, or in some implementations, one or more different types of data. For example, if particular entity data 102 includes a type of data that is not present in other entity data 102, different encoders may be used to determine embeddings based on different entity data 102.

At 306, first document data 108(1) may be encoded using a second encoder to generate a first document embedding 112(1). The first document data 108(1) may include text data, and in some implementations, layout data or one or more other types of data. For example, the first document data 108(1) may include text associated with a topic, an item available for purchase, lease, or subscription, a business entity, a law or regulation, and so forth. For example, the first document data 108(1) may include a token, word, or group of words within a document. As such, the second encoder may include one or more language models configured to generate vector embeddings or other representations of the text of the first document data 108(1) based on the characteristics of the text. In cases where the first document data 108(1) includes other types of data, such as layout data, the second encoder may include models configured to determine embeddings based in part on the layout data. While FIG. 2 describes an implementation in which the document data 108 is encoded using a different encoder than the encoder used to encode the entity data 102, in other implementations, if the entity data 102 and the document data 108 include the same types of data, the entity data 102 and the document data 108 may each be separately encoded using the same encoder or the same type of encoder. The determined first document embedding 112(1) may include a vector or other valued representation of text, such as a token, word, or group of words, in which the embedding represents the text in such a way that different text that is closer together in vector space is expected to be semantically similar.

At 308, second document data 108(2) may be encoded using the second encoder to generate a second document embedding 112(2). While FIG. 2 describes an implementation in which document data 108 representing two portions of a document is encoded to generate respective document embeddings 112, any number of document embeddings 112 may be generated in the manner described herein. The second document data 108(2) may include the same type(s) of data as the first document data 108(1), or in some implementations, one or more different types of data. For example, if one of the first document data 108(1) or the second document data 108(2) includes a type of data that is not present in the other of the first document data 108(1) or the second document data 108(2), different encoders may be used to determine embeddings based on the first document data 108(1) and the second document data 108(2).

While FIG. 3 conceptually illustrates determining entity embeddings 106 and document embeddings 112 as four steps (302, 304, 306, 308), using one or more encoders to encode text to determine embeddings may occur as a single operation. In other cases, encoding text may include a set of operations, however various combinations of encoding processes may be performed as a single operation within the set.

At 310, a first weighed embedding 116(1) may be determined based on a cross-attention function, the first document embedding 112(1), and the first set of entity embedding 106s. The weighted embedding 116(1) may include one or more weights representative of the alignment between the text represented by the first document embedding 112(1) and the determined first set of entity embeddings 106 for the first entity. For example, as described with regard to FIG. 1, a cross-attention module 114 may determine a first matrix based on the entity embeddings 106 and a second matrix based on the document embeddings 112, and may determine a third matrix that includes the weighted embeddings 116 based on the first matrix and second matrix. For example, Equation 1, described above, presents one possible relationship between the third matrix and the first and second matrices. In some implementations, the document embeddings 112 may act as queries and the entity embeddings 106 may act as keys and values for the attention mechanism of the transformer architecture of the cross-attention module 114. The determined weighted embedding 116 may store values that represent the alignment (e.g., semantic relationship) between entity embeddings 106 and the represented document embeddings 112. The values of the weighted embedding 116 may cause text represented by document embedding 112 that has a strong semantic relationship with entity embeddings 106 to have a greater effect on a score associated with the document embedding 112.

At 312, a second weighted embedding 116(2) may be determined based on the cross-attention function, the second document embedding 112(2), and the first set of entity embeddings 106 associated with the first entity. In some implementations, the second weighted embedding 116(2) may be determined using the same operation used to determine the first weighted embedding 116(1). For example, as described with regard to Equation 1 above, the third matrix that is determined based on the first and second matrices based on the entity embeddings 106 and document embeddings 112, may include weighted embeddings 116 for each document embedding 112. In other implementations, different operations may be used to determine each weighted embedding 116 or different sets of weighted embeddings 116.

In a similar manner, at 314, a third weighted embedding 116(3) may be determined based on the cross-attention function, the first document embedding 112(1), and the second set of entity embeddings 106 associated with the second entity.

At 316, a fourth weighted embedding 116(4) may be determined based on the cross-attention function, the second document embedding 112(2), and the second set of entity embeddings associated with the second entity.

At 318, a first score or set of scores may be determined based on correspondence between the first weighted embedding 116(1) and the first document embedding 112(1). In some implementations, the first set of scores may be determined based on a dot product of the first weighted embedding 116(1) the first document embedding 112(1). Example operations for determining a dot product are described with regard to Equation 2 and Equation 3 above. The first set of scores may represent a probability that text represented by the first document embedding 112(1) is associated with the first entity due to use of the first set of entity embeddings to determine the first weighted embedding 116(1). For example, if a portion of a document represented by the first document embedding 112(1) includes the name of a city, and the entity data 102 represents an entity for "location", with entity descriptors 204 of "country, city, mountain range, body of water" a score may indicate a high probability due to a strong semantic relationship between the name of the city and the entity descriptor 204. Because the portions of the document data 108 are strongly aligned with the entity descriptor 204 "city", the first weighted embedding 116(1) may include one or more weights that cause scores to be more strongly affected by the semantic relationship between the portions of the document data 108 and the entity descriptor 204. Use of the weighted embedding 116(1) may therefore result in determination of a score that is more accurate than a score that would be determined using a pooled representation of each entity embedding 106, such as when using a conventional bi-encoder.

At 320, a second score or set of scores may be determined based on correspondence between the second weighted embedding 116(2) and the second set document embedding 112(2). The second set of scores may represent a probability that the second document embedding is associated with the first entity due to use of the first set of entity embeddings to determine the second weighted embedding 116(2).

At 322, a third score or set of scores may be determined based on correspondence between the third weighted embedding 116(3) and the first document embedding 112(1). The third set of scores may represent a probability that text represented by the first document embedding 112(1) is associated with the second entity due to use of the second set of entity embeddings to determine the third weighted embedding 116(3).

At 324, a fourth score or set of scores may be determined based on correspondence between the fourth weighted embedding 116(4) and the second document embedding 112(2). The fourth set of scores may represent a probability that the second document embedding is associated with the second entity due to use of the second set of entity embeddings to determine the fourth weighted embedding 116(4).

While FIG. 3 describes an implementation in which a set of scores is determined through a separate operation, such as a dot product, for each weighted embedding 116 and each corresponding document embedding 112, in other implementations, scores may be determined for only a subset of the weighted embeddings 116 or document embeddings 112, or multiple sets of scores may be determined through a single operation. Each score may represent a probability that the text represented by a document embedding 112 includes text that is related to or references text represented by a weighted embedding 116.

At 322, output may be generated based on the first, second, third, and fourth sets of scores. For example, output may indicate particular documents or portions of documents that include text relevant to particular entities. In some cases, the output may indicate the particular text of a document that is relevant to an entity. In some implementations, an output module 122 may decode an embedding to determine text to be included in output.

FIG. 4 is a block diagram 400 depicting an implementation of a computing device 402 within the present disclosure. The computing device 402 may include one or more server(s) that store the modules and data described with regard to FIGS. 1 and 2 and perform the process described with regard to FIG. 3. In other implementations one or more other types of computing devices 402 may perform one or more of the functions described with regard to FIGS. 1-3. For example, different servers or other computing devices 402 may encode text, determine weighted embeddings 116, determine scores based on embeddings, and so forth. In some cases, different servers or other computing devices 402 may train machine learning modules, such as encoders, cross-attention modules 114, scoring modules 118, and so forth. As such, while FIG. 4 depicts a single block diagram 400, the depicted computing device 402 may include any number of computing devices of similar or different types, including without limitation servers, personal computing devices, portable computing devices, and so forth.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 316, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 3G, 4G, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices, network attached storage devices, and so forth.

A communication module 424 may be configured to establish communications with one or more other computing devices 402. Communications may be authenticated, encrypted, and so forth.

The memory 418 may also store the entity encoder 104. The entity encoder 104 may encode entity data 102 to determine entity embeddings 106. An entity embedding 106 may include a contextualized representation, such as a vector, of the text included in entity data 102. In some implementations, the entity encoder 104 may include one or more language models, such as a transformer-based language model (e.g., BERT or RoBERTA), or other types of language models. In cases where the entity data 102 includes types of data other than text data, the entity encoder 104 may include one or more models that are configured to determine embeddings based on layout data, image data, or other types of data.

The memory 418 may additionally store the document encoder 110. The document encoder 110 may encode document data 108 to determine document embeddings 112. A document embedding 112 may include a contextualized representation, such as a vector, of the text included in document data 108. In some implementations, the document encoder 110 may include one or more transformer-based language models, or other types of language models. In cases where the document data 108 includes one or more types of data other than text data, the document encoder 110 may include one or more models configured to determine embeddings based on the other types of data. In some cases, the document encoder 110 may include a different type of encoder than the entity encoder 104. For example, if the entity data 102 includes text data and the document data 108 includes text data and layout data, the entity encoder 104 may include a transformer-based language model, while the document encoder 110 may include one or more models configured to determine embeddings based on layout data and text data.

The memory 418 may store the cross-attention module 114. The cross-attention module 114 may determine weighted embeddings 116 based on entity embeddings 106 and document embeddings 112. For example, the cross-attention module 114 may facilitate alignment between the entity embeddings 106 and relevant portions of the document embeddings 112, such as portions of document embeddings 112 representing text that is semantically related to text represented by an entity embedding 106. In some implementations, the cross-attention module 114 may determine a first matrix based on the entity embeddings 106 and a second matrix based on the document embeddings 112, and may determine a third matrix that includes the weighted embeddings 116 based on the first matrix and second matrix. In some implementations, the document embeddings 112 may act as queries in the cross-attention function performed by the cross-attention module 114, while the entity embeddings 106 act as keys and values. For example, Equation 1, described above, presents one possible relationship between the third matrix and the first and second matrices. The weighted embeddings 116 may store values for a represented document embedding 112 that are most aligned with the entity embeddings 106. In some implementations, the weighted embeddings 116 may include one or more weights based on the semantic relationships between entity data 102 and document data 108. For example, the weights may cause portions of a weighted embedding 116 that represent text having a strong semantic relationship with entity data 102 to have a greater effect on a score associated with the weighted embedding 116 than other text represented by the weighted embedding 116.

The memory 418 may also store the scoring module 118. The scoring module 118 may determine correspondence scores 120 based on correspondence between weighted embeddings 116 and document embeddings 112. A correspondence score 120 may indicate a probability that the text represented by a particular document embedding 112 references or may be classified as a reference to a particular entity. In some implementations, a correspondence score 120 may be determined based on dot product operations between a weighted embedding 116 and a document embedding 112, as described with regard to Equation 2 and Equation 3 above. Use of the cross-attention module 114 to determine weighted embeddings 116 may enable the correspondence scores 120 to account for semantic relationships between the text represented by the entity embeddings 106 and the text represented by the document embeddings 112.

The memory 418 may additionally store the output module 122. The output module 122 may generate output data 124 based on one or more of the correspondence scores 120. For example, output data 124 may include one or more correspondence scores 120, or one or more qualitative or quantitative indications of relationships between document data 108 and respective entity data 102, such as particular portions of documents that reference particular entities, and so forth.

Other modules 426 may also be present in the memory 418. For example, other modules 426 may include permission or authorization modules for sending data to or receiving data from the computing device 402, for modifying configurations or settings, and so forth. Other modules 426 may also include encryption modules to encrypt and decrypt communications between computing devices 402, authentication modules to authenticate communications sent or received by computing devices 402, user interface modules to generate interfaces for presenting output, receiving input from users, and so forth. Other modules 426 may also include training modules for training various machine learning models, such as encoders, the cross-attention module 114, the scoring module 118, and so forth, and for setting parameters for the machine learning models.

Other data 428 within the data store(s) 422 may include configurations, settings, preferences, and default values associated with computing devices 402. Other data 428 may also include encryption keys and schema, access credentials, and so forth. Other data 428 may include various rules, algorithms, and thresholds for performance of various tasks, such as determining correspondence scores 120 or generating output data 124. Other data 428 may include training data and parameters for various machine learning networks.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more non-transitory memories storing computer-executable instructions; and
   one or more hardware processors to execute the computer-executable instructions to:
   encode, using a first encoder, entity data representing a first named entity to generate a first entity embedding and a second entity embedding;
   encode, using a second encoder, first document data representing a first portion of a document to generate a first document embedding
   and second document data representing a second portion of the document to generate a second document embedding;
   determine a first weighted embedding based on:
   a cross-attention function in which the first document embedding is used as a query for the cross-attention function and the first entity embedding and the second entity embedding are used as keys and values for the cross-attention function,
   wherein the first weighted embedding includes: one or more first values representing first semantic relationships between the first document data, the first entity embedding, and the second entity embedding;
   determine a second weighted embedding based on:
   the cross-attention function in which the second document embedding is used as a query for the cross-attention function and the first entity embedding and the second entity embedding are used as keys and values for the cross-attention function,
   wherein the second weighted embedding includes: one or more second values indicative of second semantic relationships between the second document data, the first entity embedding, and the second entity embedding;
   determine a first score based on correspondence between the first weighted embedding and the first document embedding, wherein the first score represents occurrences, within the first document data, of text associated with the entity data;
   determine a second score based on correspondence between the second weighted embedding and the second document embedding, wherein the second score represents occurrences, within the second document data, of text associated with the entity data; and
   generate output based on the first score and the second score, wherein the output is indicative of inclusion of text that references the first named entity within one or more of the first document data or the second document data.

2. The system of claim 1, wherein:

the entity data comprises text data, and the first encoder is a first type of encoder configured to determine embeddings based on text data, at least one of the first document data or the second document data comprises text data and layout data; and the second encoder is a second type of encoder that differs from the first type of encoder and is configured to determine embeddings based on text data and layout data.

3. The system of claim 1, further comprising computer-executable instructions to:

determine a first matrix (T) based on the first document embedding and the second document embedding; and determine a second matrix (L) based on the first entity embedding and the second entity embedding;

wherein the cross-attention function is used to determine a third matrix (U) based on the equation: $U=\text{softmax}(TL^{T})L$; and wherein the first weighted embedding and the second weighted embedding are determined based on the third matrix.

4. A system comprising:

one or more non-transitory memories storing computer-executable instructions; and one or more hardware processors to execute the computer-executable instructions to:

determine a first embedding based on first text;

determine a second embedding based on second text;

determine a third embedding based on third text;

determine a fourth embedding based on fourth text;

determine a fifth embedding and a sixth embedding based on a cross-attention function in which the third embedding and fourth embedding are inputs used as queries for the cross-attention function and the first embedding and the second embedding are inputs used as one or more of keys or values for the cross-attention function, wherein the fifth embedding includes one or more first values indicative of first semantic relationships between the first text, the second text, and the third text, and wherein the sixth embedding includes one or more second values indicative of second semantic relationships between the first text, the second text, and the fourth text;

determine a first score based on correspondence between the fifth embedding and the third embedding;

determine a second score based on correspondence between the sixth embedding and the fourth embedding; and generate output based on the first score and the second score.

5. The system of claim 4, further comprising computer-executable instructions to:

encode first data using a first encoder to determine the first embedding;

encode second data using the first encoder to determine the second embedding;

encode third data using a second encoder that differs from the first encoder to determine the third embedding; and encode fourth data using the second encoder to determine the fourth embedding.

6. The system of claim 5, wherein:

the first data comprises the first text;

the second data comprises the second text;

the third data comprises the third text and first layout data;

the fourth data comprises the fourth text and second layout data; and the second encoder is configured to determine embeddings based at least in part on layout data.

7. The system of claim 4, wherein:

the first score is further based at least in part on a first dot product associated with the fifth embedding and the third embedding; and the second score is further based at least in part on a second dot product associated with the sixth embedding and the fourth embedding.

8. The system of claim 4, further comprising computer-executable instructions to:

determine a first matrix (T) based on the third embedding and the fourth embedding; and determine a second matrix (L) based on the first embedding and the second embedding;

wherein the cross-attention function is used to determine a third matrix (U) that comprises the fifth embedding and the sixth embedding based on the first matrix and the second matrix; and wherein the fifth embedding and the sixth embedding are determined based on the third matrix.

9. The system of claim 8, wherein the cross-attention function is used to determine the third matrix based on the equation: $U=\text{softmax}(TL^{T})L$.

10. The system of claim 4, wherein:

the first score represents a first probability that the third text associated with the third embedding is associated with one or more of the first text associated with the first embedding or the second text associated with the second embedding; and the second score represents a second probability that the fourth text associated with the fourth embedding is associated with the one or more of the first text associated with the first embedding or the second text associated with the second embedding.

11. The system of claim 4, wherein:

the first text and the second text are associated with a first entity;

the third text is associated with a first portion of a document;

the fourth text is associated with a second portion of the document;

the first score is indicative of inclusion or exclusion of text associated with the first entity within the first portion of the document; and the second score is indicative of inclusion or exclusion of text associated with the first entity within the second portion of the document.

12. A system comprising:

one or more non-transitory memories storing computer-executable instructions; and one or more hardware processors to execute the computer-executable instructions to:

determine a first embedding based on first text;

determine a second embedding based on second text;

determine a third embedding based on third text;

determine a fourth embedding based on a cross-attention function, the first embedding and the second embedding, wherein the fourth embedding includes one or more first values indicative of semantic relationships between the first text and the second text;

determine a fifth embedding based on the cross-attention function, the first embedding, and the third embedding, wherein the fifth embedding includes one or more second values indicative of semantic relationships between the first text and the third text;

determine a first score based on correspondence between the fourth embedding and the first embedding, wherein the first score represents occurrences, within the first text, of text associated with the second text;

determine a second score based on correspondence between the fifth embedding and the first embedding, wherein the second score represents occurrences, within the second text, of text associated with the third text; and generate output based on the first score and the second score.

13. The system of claim 12, further comprising computer-executable instructions to:

determine a sixth embedding based on fourth text;

determine a seventh embedding based on the cross-attention function, the sixth embedding and the second embedding, wherein the seventh embedding includes one or more third values indicative of semantic relationships between the fourth text and the second text;

determine an eighth embedding based on the cross-attention function, the sixth embedding, and the third embedding, wherein the eighth embedding includes one or more fourth values indicative of semantic relationships between the fourth text and the third text;

determine a third score based on correspondence between the seventh embedding and the sixth embedding; and determine a fourth score based on correspondence between the eighth embedding and the sixth embedding;

wherein the output is further based on the third score and the fourth score.

14. The system of claim 13, wherein the first embedding and the sixth embedding are inputs to the cross-attention function used as queries, and the second embedding and the third embedding are inputs to the cross-attention function used as one or more of keys or values.

15. The system of claim 13, further comprising computer-executable instructions to:

determine a first matrix (T) based on the first embedding; and determine a second matrix (L) based on the second embedding;

wherein the cross-attention function is used to determine a third matrix (U) that comprises the fourth embedding based on the first matrix and the second matrix.

16. The system of claim 15, wherein the cross-attention function is used to determine the third matrix based on the equation: $U=\mathrm{softmax}\ (TL^{T})L$.

17. The system of claim 12, further comprising computer-executable instructions to:

encode the second text to determine the second embedding using a first encoder;

encode the third text to determine the third embedding using the first encoder; and encode the first text and layout data associated with the first text to determine the first embedding using a second encoder, wherein the second encoder differs from the first encoder and is configured to determine embeddings based in part on layout data.

18. The system of claim 12, wherein the first score is further based at least in part on a dot product associated with the fourth embedding and the first embedding, and the second score is further based at least in part on a dot product associated with the fifth embedding and the first embedding.

19. The system of claim 12, wherein the first score represents a probability that the first text is associated with the second text, and the second score represents a probability that the first text is associated with the third text.

20. The system of claim 12, wherein:

the first text is associated with at least a portion of a document;

the second text is associated with a first entity;

the third text is associated with a second entity;

the first score is indicative of inclusion or exclusion of text associated with the first entity within the at least a portion of the document; and the second score is indicative of inclusion or exclusion of text associated with the second entity within the at least a portion of the document.

* * * * *